W. T. DUVALL.
Clay Sawing and Pulverizing Machine.
No. 202,337. Patented April 16, 1878.
Fig. 1.
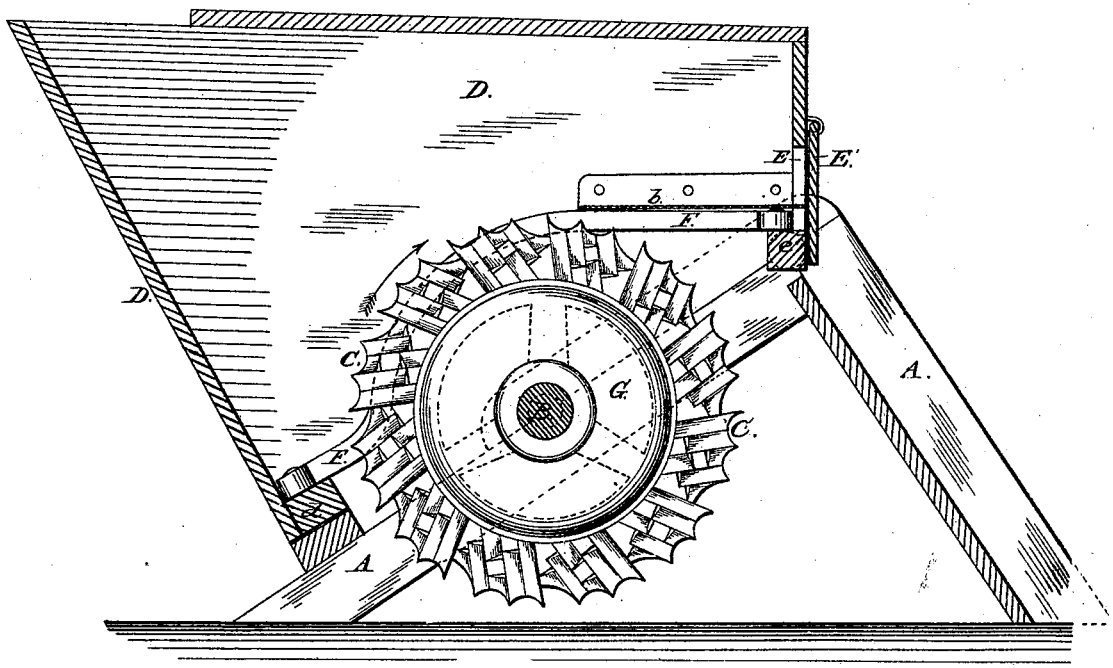
Fig. 2.
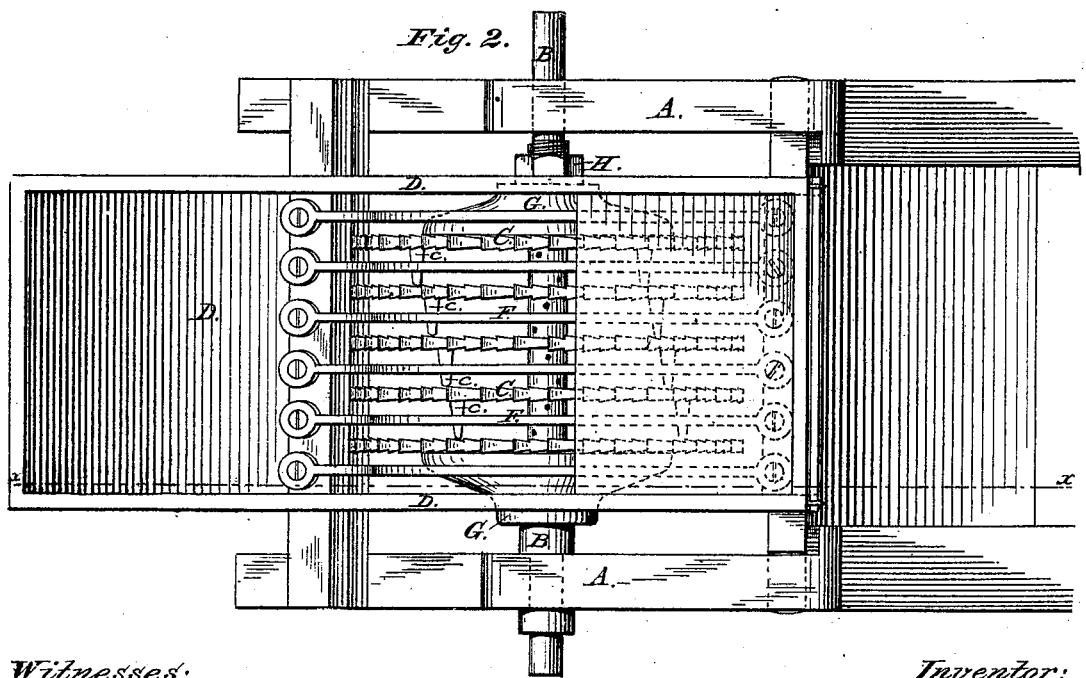
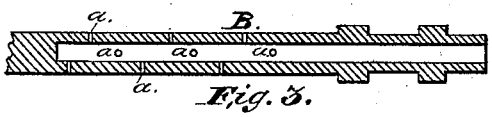
Fig. 3.
Witnesses:
Inventor:

UNITED STATES PATENT OFFICE.

WILLIAM T. DUVALL, OF GEORGETOWN, DISTRICT OF COLUMBIA, ASSIGNOR OF THREE-FOURTHS HIS RIGHT TO RICHARD L. CROPLEY, ARTHUR B. CROPLEY, AND ALFRED DUVALL, OF SAME PLACE.

IMPROVEMENT IN CLAY SAWING AND PULVERIZING MACHINES.

Specification forming part of Letters Patent No. 202,337, dated April 16, 1878; application filed March 19, 1878.

*To all whom it may concern:*

Be it known that I, WILLIAM T. DUVALL, of Georgetown, in the District of Columbia, have invented certain new and useful Improvements in Clay Sawing and Pulverizing Machines; and I do hereby declare that the following is a full, clear, and exact description of my invention, which will enable others skilled in the art to which it appertains to make and use the same, reference being had to the accompanying drawings, and to letters of reference marked thereon, which form a part of this specification.

The object of my invention is to produce a machine for sawing, grinding, or breaking up clay, &c., used for making bricks, tiles, &c., and at the same time to separate therefrom the stones and gravel.

The invention consists of a suitable frame supporting a hopper-shaped receptacle, in which is arranged a hollow shaft, provided with a series of saws or wheels, provided with teeth on their periphery and corrugated or roughened on their sides, between each of which is placed a curved flat bar of iron, forming a grate, which is secured at the front and rear ends of the receptacle. As close as possible to the periphery of the wheel, and toward the rear of the hopper, is secured a flat plate, upon which the stones, &c., are received when thrown up by the wheel, and after accumulating they may be taken out at the rear end of the receptacle through an opening and hinged door. The clay is thus separated and reduced by being sawed, ground, and cut up as it lies with its weight against the saws, similar to wood being cut up by a saw, all of which will be more fully described hereinafter, reference being had to the accompanying drawings, in which—

Figure 1 is a vertical cross-section on line $x$ $x$, Fig. 2. Fig. 2 is a plan view of the machine. Fig. 3 is a longitudinal section of the hollow shaft.

In the drawings, A represents a stout frame, preferably of the form shown, in which is journaled the shaft B. This shaft is made hollow, is provided with a number of perforations, and is connected with a suitable water-supply, so as to throw jets of water into the clay to moisten it. Upon this shaft are secured a number of saws or wheels, C, having their peripheries cut like teeth and their sides roughened or corrugated, so as to more readily saw or break up and cut the clay with which they come in contact.

A suitable hopper or receptacle, D, is hinged or journaled at the upper corner of the frame A, and is provided with an opening, E, and a hinged gate or door, E'. At the rear side of the hopper D, and as close as possible to the periphery of the wheels C, is arranged a plate of iron or wood, $b$, extending to near the center of the wheel, upon which the stone or gravel, &c., are received as they are brought or thrown up by the revolving saws or wheels, and they can be afterward withdrawn through the door. Between each of the saws or wheels C is arranged a curved bar, F, secured to a cross-piece, $d$, and $e$ of the hopper, and thus form a grate, the object of which is to retain the clay on them while it is sawed or broken up.

On one side of the wheels are cast projecting pins or studs $c$, to keep the saws or wheels the proper distance apart; and on the outside of the outer saws or wheels is secured a washer or plate, G, by which, and with the nut H, the wheels are clamped and held in their proper positions on the shaft. The roughened sides of the saws or wheels prevent them from becoming clogged or choked.

The operation is as follows: The clay is introduced into the hopper D, and, motion being imparted in any suitable manner to the saws or wheels C, they will move in the direction of the arrow, when the clay, by its weight lying against them, will be sawed or cut up into small particles, which will fall between the saws and the grating, like sawdust, while any stones or pieces that cannot be broken by the said saws will be thrown onto the plate $b$, and can then be removed through the opening E and hinged door or gate E'. The clay is thus separated from stones, &c., while it is broken up into small particles, which can then be used to great advantage for making bricks, tiles, &c.

The advantages of my machine are that it is very simple in construction; it does its work very thoroughly and economically; it is not liable to get out of order, and it can be furnished at a very moderate cost.

Having thus described my invention, what I claim, and desire to secure by Letters Patent, is—

1. In a clay saw or pulverizer, the series of saws or wheels C, roughened on their sides and provided with points or teeth on their periphery, and arranged substantially as shown and described.

2. In a clay-saw, the combination of the hollow shaft B, provided with perforations $a$, with the saws C and grate or curved bars F, arranged substantially as shown, and for the purpose herein described.

3. The clay saw or pulverizer herein described, consisting of the frame A, hopper D, provided with plate $b$ and opening E, door E', the saws C, and grate or curved bars F, all constructed and arranged for operation substantially as shown and specified.

In testimony that I claim the foregoing as my own I hereby affix my signature in presence of two witnesses.

WM. T. DUVALL.

Witnesses:
CHARLES B. CROPLEY,
MAYHEW PLATER.